(12) United States Patent
Saliba

(10) Patent No.: US 6,980,390 B2
(45) Date of Patent: Dec. 27, 2005

(54) MAGNETIC MEDIA WITH EMBEDDED OPTICAL SERVO TRACKS

(75) Inventor: George Saliba, Northborough, MA (US)

(73) Assignee: Quantum Corporation, San Jose, CA (US)

( * ) Notice: Subject to any disclaimer, the term of this patent is extended or adjusted under 35 U.S.C. 154(b) by 198 days.

(21) Appl. No.: 10/359,452

(22) Filed: Feb. 5, 2003

(65) Prior Publication Data

US 2005/0057836 A1 Mar. 17, 2005

(51) Int. Cl.⁷ .......................................... G11B 5/584
(52) U.S. Cl. ................................................. 360/77.12
(58) Field of Search ........................ 360/69, 77.12, 360/134, 135, 291, 77.03; 369/53.1; 428/156, 428/323

(56) References Cited

U.S. PATENT DOCUMENTS

| | | |
|---|---|---|
| 2,923,781 A | 2/1960 | Gordon et al. |
| 3,113,179 A | 12/1963 | Glenn, Jr. |
| 3,239,841 A | 3/1966 | Henkes, Jr. |
| 3,404,392 A | 10/1968 | Sordello |
| 3,426,337 A | 2/1969 | Black et al. |
| 3,610,721 A | 10/1971 | Abramson et al. |
| 3,637,991 A | 1/1972 | Yanagawa |
| 3,662,120 A | 5/1972 | Hess |
| 3,768,752 A | 10/1973 | Bettini et al. |
| 3,786,752 A | 1/1974 | Lingens et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Laridon et al. |
| 3,997,715 A | 12/1976 | Elliott |
| 4,008,085 A | 2/1977 | Lemahieu et al. |
| 4,123,788 A | 10/1978 | Kruger |
| 4,136,347 A | 1/1979 | Braitberg |
| 4,176,381 A | 11/1979 | de Niet et al. |
| 4,275,425 A | 6/1981 | Watanabe et al. |
| 4,313,143 A | 1/1982 | Zarr |
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,424,111 A | 1/1984 | Zielke et al. |
| 4,531,205 A | 7/1985 | Faugeras |

(Continued)

FOREIGN PATENT DOCUMENTS

CH          586 944          4/1977

(Continued)

OTHER PUBLICATIONS

European Search Report mailed on Aug. 22, 2003, for European Patent Application No. 03252726.9 filed on Apr. 30, 2003, and published on Nov. 12, 2003 as European Publication No. 1 361 568, 3 pages.

(Continued)

*Primary Examiner*—David Hudspeth
*Assistant Examiner*—Fred F. Tzeng
(74) *Attorney, Agent, or Firm*—Morrison & Foerster LLP

(57) ABSTRACT

A storage medium is provided that includes a magnetic recording tape having a first side and a second side, and a plurality of optically detectable indicia embedded in a servo layer disposed between the first side and the second side of the tape. The optical reflectivity and/or phase of the indicia are different from the surrounding servo layer, and the indicia are optically accessible from at least one of the first side and the second side of the tape. The servo layer may include an organic material wherein the indicia are created with an infrared or ultra violet light source.

37 Claims, 9 Drawing Sheets

U.S. PATENT DOCUMENTS

| | | | |
|---|---|---|---|
| 4,558,383 A | 12/1985 | Johnson | |
| 4,570,191 A | 2/1986 | Di Stefano et al. | |
| 4,578,311 A | 3/1986 | Ishikuro et al. | |
| 4,626,469 A | 12/1986 | Yamaguchi et al. | |
| 4,633,451 A | 12/1986 | Ahn et al. | |
| 4,679,104 A | 7/1987 | Dahlerud | |
| 4,684,547 A | 8/1987 | DiStefano et al. | |
| 4,737,877 A | 4/1988 | Krongelb et al. | |
| 4,746,542 A | 5/1988 | Chino et al. | |
| 4,750,067 A | 6/1988 | Gerfast | |
| 4,759,991 A * | 7/1988 | Kanno et al. | 428/447 |
| 4,775,969 A * | 10/1988 | Osterlund | 369/53.1 |
| 4,788,129 A | 11/1988 | Bouldin et al. | |
| 4,802,030 A | 1/1989 | Henry et al. | |
| 4,816,939 A | 3/1989 | Ford et al. | |
| 4,816,941 A | 3/1989 | Edel et al. | |
| 4,833,556 A | 5/1989 | Kosarko et al. | |
| 4,843,494 A | 6/1989 | Cronin et al. | |
| 4,848,698 A | 7/1989 | Newell et al. | |
| 4,868,046 A | 9/1989 | Moriizumi et al. | |
| 4,876,886 A | 10/1989 | Bible et al. | |
| 4,884,260 A | 11/1989 | Bouldin et al. | |
| 4,935,835 A | 6/1990 | Godwin et al. | |
| 4,937,810 A | 6/1990 | Drexler et al. | |
| 4,958,245 A | 9/1990 | Roth et al. | |
| 4,961,123 A | 10/1990 | Williams et al. | |
| 4,969,058 A | 11/1990 | Williams et al. | |
| 4,983,496 A | 1/1991 | Newell et al. | |
| 5,008,765 A | 4/1991 | Youngquist | |
| 5,016,240 A | 5/1991 | Strandjord et al. | |
| 5,038,030 A | 8/1991 | Hayashi et al. | |
| 5,050,017 A | 9/1991 | Carr et al. | |
| 5,060,212 A | 10/1991 | Fujita et al. | |
| 5,065,387 A | 11/1991 | Roth et al. | |
| 5,067,039 A * | 11/1991 | Godwin et al. | 360/135 |
| 5,073,884 A | 12/1991 | Kobayashi | |
| 5,080,479 A * | 1/1992 | Rosenberg | 352/92 |
| 5,097,351 A | 3/1992 | Kramer | |
| 5,105,322 A | 4/1992 | Steltzer | |
| 5,111,448 A | 5/1992 | Komma et al. | |
| 5,120,927 A | 6/1992 | Williams et al. | |
| 5,121,371 A | 6/1992 | Farnsworth et al. | |
| 5,122,727 A * | 6/1992 | Janssen et al. | 323/272 |
| 5,144,604 A | 9/1992 | Sugiura | |
| 5,163,032 A | 11/1992 | Van Nieuwland et al. | |
| 5,179,463 A | 1/1993 | Kramer | |
| 5,196,297 A | 3/1993 | Dombrowski, Jr. et al. | |
| 5,196,969 A | 3/1993 | Iwamatsu et al. | |
| 5,210,672 A | 5/1993 | Ivers et al. | |
| 5,218,595 A | 6/1993 | Lehureau et al. | |
| 5,229,620 A | 7/1993 | Pahr | |
| 5,262,908 A | 11/1993 | Iwamatsu et al. | |
| 5,279,775 A | 1/1994 | Thomas et al. | |
| 5,280,402 A | 1/1994 | Anderson et al. | |
| 5,283,773 A | 2/1994 | Thomas et al. | |
| 5,293,367 A | 3/1994 | Kadowaki et al. | |
| 5,311,378 A | 5/1994 | Williams et al. | |
| 5,319,507 A | 6/1994 | Umebayashi et al. | |
| 5,322,987 A | 6/1994 | Thomas et al. | |
| 5,331,621 A | 7/1994 | Miyake et al. | |
| 5,333,091 A | 7/1994 | Iggulden et al. | |
| 5,334,849 A | 8/1994 | Thomas et al. | |
| 5,349,484 A | 9/1994 | Koehler | |
| 5,363,255 A | 11/1994 | Ivers et al. | |
| 5,369,631 A | 11/1994 | Hwang | |
| 5,371,636 A | 12/1994 | Nayak et al. | |
| 5,379,283 A | 1/1995 | Miyajima | |
| 5,379,710 A | 1/1995 | Parnigoni | |
| 5,382,463 A * | 1/1995 | Adkins et al. | 428/141 |
| 5,414,578 A | 5/1995 | Lian et al. | |
| 5,414,585 A | 5/1995 | Saliba | |
| 5,432,652 A | 7/1995 | Comeaux et al. | |
| 5,448,430 A | 9/1995 | Bailey et al. | |
| 5,450,257 A | 9/1995 | Tran et al. | |
| 5,452,152 A | 9/1995 | Rudi | |
| 5,457,586 A | 10/1995 | Solhjell | |
| 5,462,823 A * | 10/1995 | Evans et al. | 430/14 |
| 5,475,670 A | 12/1995 | Hamada et al. | |
| 5,475,673 A * | 12/1995 | Adkins | 369/286 |
| 5,493,554 A | 2/1996 | Sasaki et al. | |
| 5,510,140 A | 4/1996 | Kurose et al. | |
| 5,515,212 A | 5/1996 | Chiao et al. | |
| 5,518,804 A | 5/1996 | Mizuno et al. | |
| 5,523,904 A | 6/1996 | Saliba | |
| 5,532,042 A | 7/1996 | Kawarai et al. | |
| 5,535,069 A | 7/1996 | Chiao et al. | |
| 5,563,868 A | 10/1996 | Farnsworth et al. | |
| 5,566,033 A | 10/1996 | Frame et al. | |
| 5,579,717 A * | 12/1996 | Crandell et al. | 116/208 |
| 5,581,523 A | 12/1996 | Seki et al. | |
| 5,589,247 A | 12/1996 | Wallack et al. | |
| 5,606,542 A | 2/1997 | Kim | |
| 5,615,205 A | 3/1997 | Belser | |
| 5,633,844 A | 5/1997 | Maeda et al. | |
| 5,648,946 A | 7/1997 | Yamazaki | |
| 5,648,951 A | 7/1997 | Kato et al. | |
| 5,655,475 A * | 8/1997 | Crandell et al. | 116/201 |
| 5,661,616 A | 8/1997 | Tran et al. | |
| 5,661,823 A | 8/1997 | Yamauchi et al. | |
| 5,674,583 A | 10/1997 | Nakayama et al. | |
| 5,675,448 A | 10/1997 | Molstad et al. | |
| 5,677,806 A | 10/1997 | Eckberg et al. | |
| 5,680,278 A | 10/1997 | Sawtelle, Jr. | |
| 5,680,384 A | 10/1997 | Seki et al. | |
| 5,687,155 A | 11/1997 | Fukakusa et al. | |
| 5,689,384 A | 11/1997 | Albrecht et al. | |
| 5,705,268 A | 1/1998 | Ishikawa et al. | |
| 5,717,674 A | 2/1998 | Mori et al. | |
| 5,718,964 A | 2/1998 | Naoe et al. | |
| 5,726,834 A | 3/1998 | Eckberg et al. | |
| 5,729,519 A | 3/1998 | Nakanishi et al. | |
| 5,774,313 A | 6/1998 | Tanaka et al. | |
| 5,815,482 A | 9/1998 | Rope et al. | |
| 5,855,519 A | 1/1999 | Kadota | |
| 5,858,589 A | 1/1999 | Govaert et al. | |
| 5,872,675 A | 2/1999 | Solhjell | |
| 5,877,910 A | 3/1999 | Williams et al. | |
| 5,886,645 A | 3/1999 | Eaton | |
| 5,906,867 A * | 5/1999 | Kaige et al. | 427/599 |
| 5,914,151 A * | 6/1999 | Usuki | 427/128 |
| 5,928,761 A * | 7/1999 | Hedblom et al. | 428/143 |
| 5,982,592 A | 11/1999 | Saito et al. | |
| 5,993,948 A | 11/1999 | Yamazaki et al. | |
| 6,018,434 A * | 1/2000 | Saliba | 360/77.13 |
| 6,031,671 A | 2/2000 | Ayres | |
| 6,033,752 A | 3/2000 | Suzuki et al. | |
| 6,063,489 A | 5/2000 | Kobayashi et al. | |
| 6,075,676 A | 6/2000 | Hiraoka et al. | |
| 6,075,678 A * | 6/2000 | Saliba | 360/291 |
| 6,084,740 A | 7/2000 | Leonhardt et al. | |
| 6,103,365 A | 8/2000 | Ishii et al. | |
| 6,108,159 A | 8/2000 | Nute et al. | |
| 6,160,568 A | 12/2000 | Brodsky et al. | |
| 6,162,532 A * | 12/2000 | Black et al. | 428/323 |
| 6,236,529 B1 | 5/2001 | Leonhardt et al. | |
| 6,246,535 B1 * | 6/2001 | Saliba et al. | 360/77.12 |
| 6,275,349 B1 * | 8/2001 | Smith | 360/77.03 |
| 6,284,361 B1 * | 9/2001 | Kobayashi et al. | 428/323 |
| 6,319,595 B1 | 11/2001 | Katashima et al. | |
| 6,365,061 B1 * | 4/2002 | Damer et al. | 216/65 |
| 6,396,776 B1 | 5/2002 | Ueyanagi | |
| 6,480,351 B2 | 11/2002 | Leonhardt et al. | |
| 6,493,174 B1 * | 12/2002 | Stubbs | 360/77.12 |
| 6,558,774 B1 * | 5/2003 | Saliba et al. | 428/156 |

| | | | | | | | |
|---|---|---|---|---|---|---|---|
| | 6,563,662 B2 * | 5/2003 | Smith ....................... 360/77.03 | GB | 2 008 290 A | 5/1979 | |
| | 6,768,608 B2 * | 7/2004 | Saliba et al. ............. 360/77.03 | GB | 1 595 136 A | 8/1981 | |
| | | | | GB | 2 121 227 A | 12/1983 | |
| | FOREIGN PATENT DOCUMENTS | | | GB | 2 335 785 A | 9/1999 | |
| DE | 24 06 292 A1 | | 8/1975 | JP | 56-111169 | 9/1981 | |
| DE | 26 16 362 A1 | | 11/1977 | JP | 57-50346 | 3/1982 | |
| DE | 32 01 935 A1 | | 8/1983 | JP | 57-120230 | 7/1982 | |
| DE | 34 17 426 A1 | | 11/1985 | JP | 57-120255 | 7/1982 | |
| DE | 41 42 052 A1 | | 7/1992 | JP | 61-142530 | 6/1986 | |
| EP | 0 069 548 | | 1/1983 | JP | 62-192025 | 8/1987 | |
| EP | 0 083 753 | | 7/1983 | JP | 63-148416 | 6/1988 | |
| EP | 0 097 774 | | 1/1984 | JP | 63-251924 | 10/1988 | |
| EP | 0 108 258 | | 5/1984 | JP | 64-70916 | 3/1989 | |
| EP | 0 119 568 | | 9/1984 | JP | 2-188915 | 7/1990 | |
| EP | 0 130 495 | | 1/1985 | JP | 3-141087 | 6/1991 | |
| EP | 0 155 000 | | 9/1985 | JP | 3-201215 | 9/1991 | |
| EP | 0 166 199 | | 1/1986 | JP | 3-219432 | 9/1991 | |
| EP | 0 177 737 | | 4/1986 | JP | 3-242816 | 10/1991 | |
| EP | 0 180 258 | | 5/1986 | JP | 4-38632 | 2/1992 | |
| EP | 0 189 948 | | 8/1986 | JP | 4-59399 | 2/1992 | |
| EP | 0 244 005 | | 11/1987 | JP | 4-252417 | 9/1992 | |
| EP | 0 257 713 | | 3/1988 | JP | 4-305844 | 10/1992 | |
| EP | 0 311 485 | | 4/1989 | JP | 5-73883 | 3/1993 | |
| EP | 0 311 859 | | 4/1989 | JP | 6-20414 | 1/1994 | |
| EP | 0 336 419 | | 10/1989 | JP | 6-139549 | 5/1994 | |
| EP | 0 344 759 | | 12/1989 | JP | 6-243619 | 9/1994 | |
| EP | 0 347 074 | | 12/1989 | JP | 6-259736 | 9/1994 | |
| EP | 0 351 837 | | 1/1990 | JP | 6-293372 | 10/1994 | |
| EP | 0 353 007 | | 1/1990 | JP | 7-29136 | 1/1995 | |
| EP | 0 368 268 | | 5/1990 | JP | 7-57412 | 3/1995 | |
| EP | 0 368 269 | | 5/1990 | JP | 7-65434 | 3/1995 | |
| EP | 0 390 555 B1 | | 10/1990 | JP | 7-182626 | 7/1995 | |
| EP | 0 423 662 A2 | | 4/1991 | JP | 7-220255 | 8/1995 | |
| EP | 0 423 662 A3 | | 4/1991 | JP | 8-174669 | 7/1996 | |
| EP | 0 434 230 A3 | | 6/1991 | JP | 8-278614 | 10/1996 | |
| EP | 0 443 810 B1 | | 8/1991 | JP | 9-007131 | 1/1997 | |
| EP | 0 484 774 A2 | | 5/1992 | JP | 9-33773 | 2/1997 | |
| EP | 0 484 774 A3 | | 5/1992 | JP | 9-35246 | 2/1997 | |
| EP | 0 484 775 A2 | | 5/1992 | JP | 9-265626 | 10/1997 | |
| EP | 0 484 775 A3 | | 5/1992 | JP | 9-288813 | 11/1997 | |
| EP | 0 484 779 A2 | | 5/1992 | JP | 9-289973 | 11/1997 | |
| EP | 0 484 780 A1 | | 5/1992 | JP | 9-293230 | 11/1997 | |
| EP | 0 496 132 | | 7/1992 | JP | 9-297914 | 11/1997 | |
| EP | 0 496 461 A1 | | 7/1992 | JP | 9-320197 | 12/1997 | |
| EP | 0 535 112 B1 | | 4/1993 | JP | 11-96705 | 4/1998 | |
| EP | 0 549 854 A1 | | 7/1993 | JP | 10-190867 | 7/1998 | |
| EP | 0 549 854 B1 | | 7/1993 | JP | 11-154312 | 6/1999 | |
| EP | 0 555 511 A1 | | 8/1993 | JP | 11-161928 | 6/1999 | |
| EP | 0 555 511 B1 | | 8/1993 | JP | 11-213383 | 8/1999 | |
| EP | 0 564 187 A2 | | 10/1993 | JP | 11-213384 | 8/1999 | |
| EP | 0 564 187 A3 | | 10/1993 | JP | 11-242814 | 9/1999 | |
| EP | 0 598 503 A2 | | 5/1994 | JP | 11-339254 | 10/1999 | |
| EP | 0 598 503 A3 | | 5/1994 | JP | 11-353642 | 12/1999 | |
| EP | 0 598 503 B1 | | 5/1994 | JP | 11-126328 | 5/2000 | |
| EP | 0 606 710 A2 | | 7/1994 | JP | 2001-67652 | 3/2001 | |
| EP | 0 606 710 A3 | | 7/1994 | JP | 2001-76326 | 3/2001 | |
| EP | 0 606 710 B1 | | 7/1994 | KR | 9406847 | 3/1994 | |
| EP | 0 645 043 B1 | | 3/1995 | SU | 1137513 A | 1/1985 | |
| EP | 0 645 044 B1 | | 3/1995 | WO | WO-83/01858 A1 | 5/1983 | |
| EP | 0 655 960 B1 | | 6/1995 | WO | WO-85/02933 A1 | 7/1985 | |
| EP | 0 684 597 A1 | | 11/1995 | WO | WO-85/03376 A1 | 8/1985 | |
| EP | 0 684 597 B1 | | 11/1995 | WO | WO-88/02168 A1 | 3/1988 | |
| EP | 0 854 471 A1 | | 7/1998 | WO | WO-91/20077 A1 | 12/1991 | |
| EP | 0 854 471 B1 | | 7/1998 | WO | WO-93/25343 A1 | 12/1993 | |
| EP | 1 026 665 A1 | | 8/2000 | WO | WO-93/26004 A1 | 12/1993 | |
| EP | 1 026 666 A1 | | 8/2000 | WO | WO-93/26007 A1 | 12/1993 | |
| EP | 1 026 667 A1 | | 8/2000 | WO | WO-94/12975 A1 | 6/1994 | |
| EP | 1 117 092 A2 | | 7/2001 | WO | WO-99/21178 A1 | 4/1999 | |
| EP | 1 117 092 A3 | | 7/2001 | WO | WO-99/21179 A1 | 4/1999 | |
| EP | 1 205 912 | | 5/2002 | WO | WO-99/27530 A1 | 6/1999 | |
| EP | 1 205 913 | | 5/2002 | WO | WO-99/28909 A1 | 6/1999 | |
| FR | 2 315 142 | | 1/1977 | WO | WO-00/30079 A1 | 5/2000 | |
| | | | | WO | WO-00/49604 A1 | 8/2000 | |

| | | |
|---|---|---|
| WO | WO-00/49605 A1 | 8/2000 |
| WO | WO-00/49607 A2 | 8/2000 |
| WO | WO-00/49607 A3 | 8/2000 |

OTHER PUBLICATIONS

U.S. Appl. No. 10/359,365, filed Feb. 5, 2003, Saliba.

Hoagland, A.S. (Mar. 1978). "Optical Servo of Magnetic Recording," *IBM Technical Disclosure Bulletin* 20(10): 4108-4109.

Ishiguro, H. et al. (Feb. 1996). "A Laser-Detector-Hologram Unit with IV Amplifiers and Built-In Micro-Mirror," *ISSCC SA*, Session 20, Paper SA 20.03, 20.3:330-331.

Johnson, M. (Aug. 1990). "Spatial Filtering For Storage Technology," *IBM Technical Disclosure Bulletin* 33(3A): 191-193.

Lambert, S. E. et al. (Apr. 1990). "Servo Scheme for Patterned Media Using Optical Detection Integrated with the Head Structure," *IBM Technical Disclosure Bulletin* 32(11): 397-399.

Yoshikawa, A. et al. (May 1995). "Laser-Detector-Hologram Unit for Thin Optical Pick-up Head of a CD Player," *IEEE Transactions on Components, Packaging, and Manufacturing Technology Part B* 18(2):245-249.

* cited by examiner

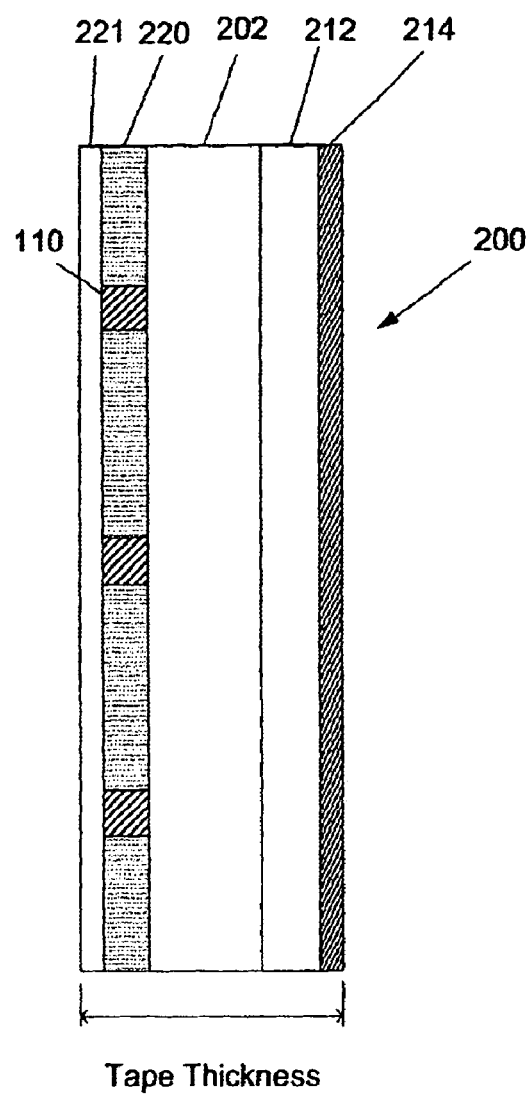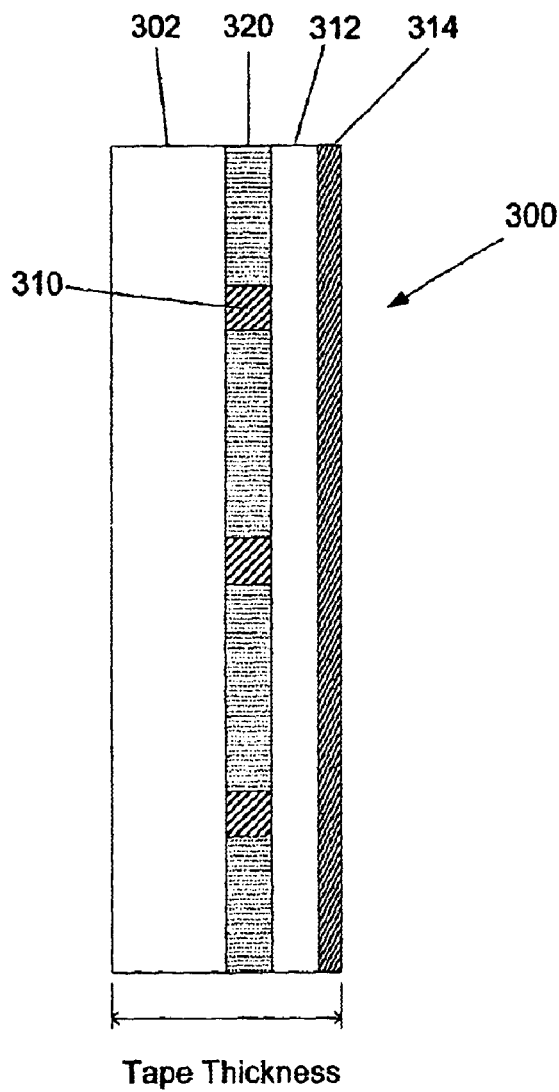
Figure 2
Figure 3

MAGNETIC MEDIA WITH EMBEDDED OPTICAL SERVO TRACKS

BACKGROUND OF THE INVENTION

1. Field of the Invention

The invention relates generally to systems and methods for tracking storage media, and more specifically to storage media and methods for manufacturing storage media with embedded optical tracking features.

2. Description of the Related Art

Digital tape-recording remains a viable solution for the storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity and retrieval performance is desired of all commercially viable mass storage devices and media. In the case of linear tape recording, a popular trend is toward multi head, multi-channel fixed head structures with narrowed recording gaps and data track widths so that many linear data tracks may be achieved on a tape medium of a predetermined width, such as one-half inch width tape. To increase the storage density for a given cartridge size, the bits on the tape may be written to smaller areas and on a plurality of parallel longitudinal tracks. As more tracks are recorded on the tape, each track becomes increasingly narrow. As the tracks become more narrow, the tape becomes more susceptible to errors caused from the tape shifting up or down (often referred to as lateral tape motion or "LTM") in a direction perpendicular to the tape travel path as the tape passes by the magnetic head. In order to maintain proper alignment of the head with the data tracks on the tape, the tape is generally mechanically constrained to minimize lateral tape motion and data retrieval errors.

Lateral tape motion is generally defined as the peak-to-peak distance of the undesirable movement (in-plane) of the tape perpendicular to its prescribed longitudinal direction of motion past a read/write head. Lateral tape motion and the ability to compensate for lateral tape motion is a major limiting factor in determining the minimum width of a track and the minimum spacing between tracks on the tape. Thus, as lateral tape motion is reduced, more tracks may be stored on the tape and the tape density increases accordingly.

Tape substrates are also being made thinner to increase data storage for a given cartridge size. The thinner tape allows more tape to be contained within the same size diameter reel packages, thereby increasing the data storage of the cartridge. Thinner tapes, however, are generally less rigid making them more susceptible to lateral tape motion errors.

One approach to minimize lateral tape motion tracking errors is to provide a multi-roller tape guide structure, such as the type described in commonly assigned U.S. Pat. No. 5,414,585, entitled "Rotating Tape Edge Guide," the disclosure thereof being incorporated herein by reference in its entirety. Such an approach has provided a viable "open loop" solution to lateral tape motion, i.e., control of lateral tape motion without the use of feedback. The advent of new head technologies, such as magneto-resistive read heads, and new higher coercivity recording media, data track widths have become very small, and many additional data tracks may be defined on the tape. Unfortunately, lateral tape motion remains as a limiting factor, and at certain data track width dimensions and data track densities, it is not possible to follow the tape accurately enough to provide reliable performance during reading and writing operations.

Several "closed loop" solutions have been developed to maintain alignment of a read/write head with data tracks and to minimize lateral tape motion tracking errors, including the use of magnetic servo tracks positioned on a the tape. Servo tracks allow for increased tracking abilities through servo track feedback mechanisms and the like. These methods, however, have not been able to keep pace with the increased data capacity desired for magnetic tape storage media, including increasingly narrow data tracks and thinner storage media. A need exists therefore for an increased ability to track storage media, including lateral tape motion, and allow for increased data storage capabilities.

BRIEF SUMMARY OF THE INVENTION

In one aspect of the invention, an exemplary storage medium is provided that includes a magnetic recording tape having a first side and a second side and a plurality of optically detectable indicia embedded in a servo layer disposed between the first side and the second side of the tape. The optical reflectivity and/or phase of the indicia is different that the surrounding servo layer, and the indicia are optically accessible from at least one of the first side and the second side of the tape. In one example, the indicia are optically accessible from both the first side and the second side. The servo layer may include an organic material where the indicia are created in the servo layer with an infrared or ultra violet light source such that the indicia are formed embedded within the tape.

In another aspect of the invention, a method for forming a servo track for a storage medium includes forming optical indicia within a magnetic recording tape from a first side of the tape, wherein the tape includes a first side and an opposite second side and the optical indicia are formed between the first side and the second side of the tape. In one example, the indicia are formed with a laser to heat and alter the reflectivity or phase of a portion of the magnetic tape embedded below the first side of the tape.

The present invention is better understood upon consideration of the detailed description below in conjunction with the accompanying drawings and claims.

BRIEF DESCRIPTION OF THE DRAWINGS

FIG. 2 illustrates a cross-sectional view of an exemplary storage medium;

FIG. 3 illustrates a cross-sectional view of an exemplary storage medium;

DETAILED DESCRIPTION OF THE INVENTION

Figure 1A:
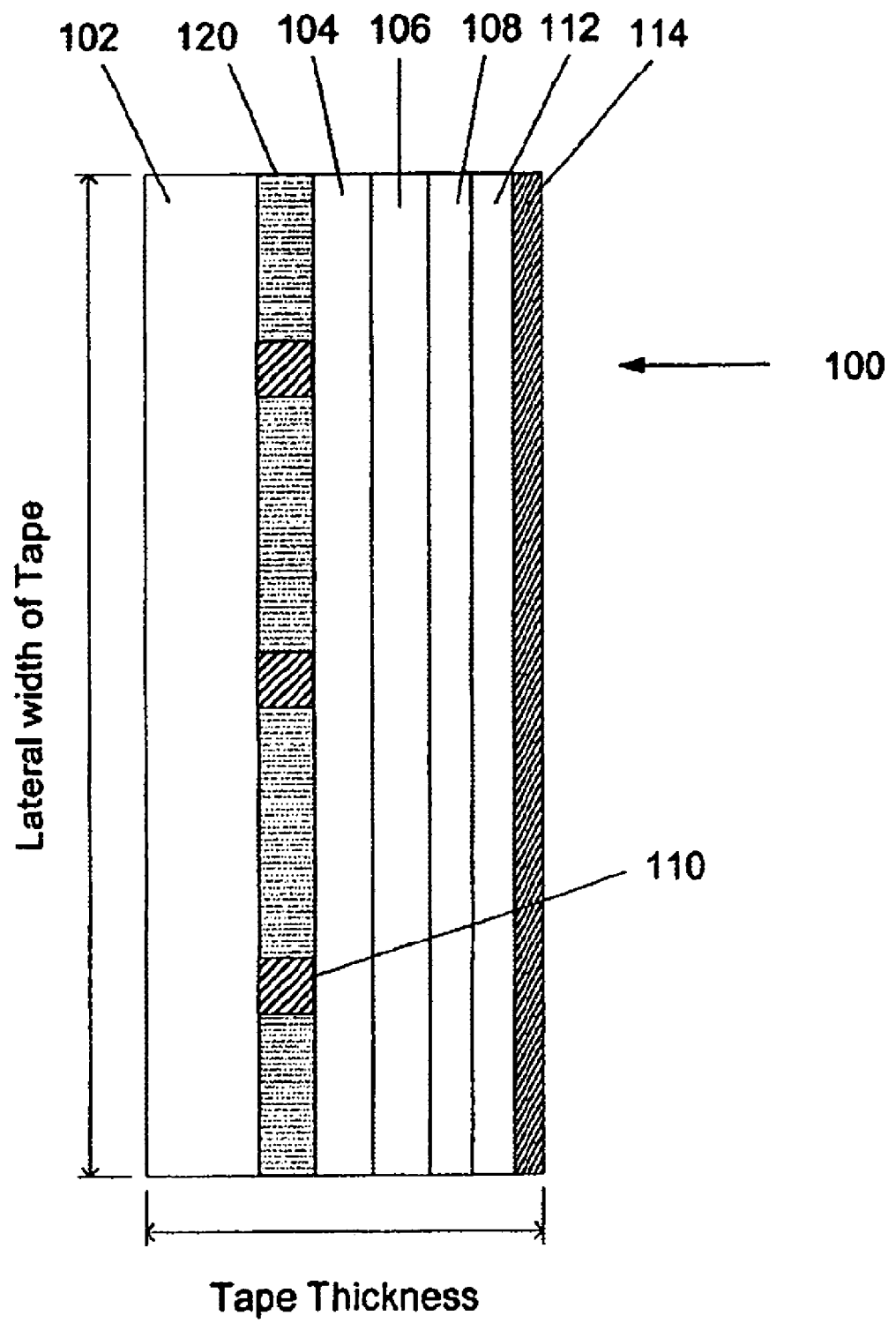
FIGS. 1A and 1B illustrate a cross-sectional view and a plan view of an exemplary storage medium.

According to one aspect, a storage medium is provided that includes a plurality of embedded optically detectable indicia. The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed.

As discussed above, although mechanical or open loop mechanisms are known to reduce lateral tape motion to some degree, at certain high linear track speeds and narrow track widths it is not practical to rely entirely upon open loop tape mechanisms. One solution for preventing errors arising from lateral tape motion with closed loop feedback is set forth in U.S. patent application Ser. No. 09/046,723, entitled "Multi-Channel Magnetic Tape System Having Optical Tracking Servo," which is incorporated by reference herein in its entirety. As disclosed therein, an optical servomechanism can be employed to track and monitor lateral motion of a magnetic tape relative to a recording head. To, this end, the magnetic tape may be provided with an optically detectable servo track that is etched onto a surface of the tape. The optically detectable servo track may include one or more narrow servo tracks along the length of the back surface of the tape, i.e., the surface opposite the recording surface, that are optically detectable to provide fine positioning information for aligning a recording head with a magnetic data track.

Other exemplary optical servo track configurations include a series of optically detectable indicia or marks that are spaced apart by a uniform distance along the length of a magnetic tape. For example, one such example is described in U.S. patent application Ser. No. 09/718,818 entitled, "Systems and Method for Forming a Servo Pattern on a Magnetic Tape," which is incorporated herein by reference in its entirety. As described therein, one method of forming servo tracks on a magnetic tape includes using a laser for ablating a surface of the magnetic tape. Laser ablation generally heats and burns a small hole or pit in a carbon layer disposed on one surface of the tape. The process, however, generally causes a burst or small explosion that may result in the creation of smoke or debris. The smoke or debris from the hole may interfere with the manufacturing process and the performance of the magnetic tape. For example, debris from forming the pits in the carbon layer may clog or foul the magnetic tape as it is spooled onto a take-up reel. Further, the pits may not be formed of a uniform size or shape due to the nature of laser ablation, i.e., burning the pits into the carbon layer with bursts of heat. Material left on the surface may also interfere with the optical detection of the pits by creating noise or false detections of servo tracks. Typically, the tape is therefore cleaned to remove debris and material after the pits are formed. Additionally, a protective coating is generally included over the indicia after they have been formed to protect them from damage such as scratches and the like during subsequent manufacturing steps or during use.

As data tracks become increasingly narrow and densely configured to meet higher storage demands, additional tracking systems and methods are desired for magnetic storage media. For example, increased tracking sensitivity to lateral tape motion and the like are desired to allow a read/write head to track increasingly narrow data tracks. Thus, one exemplary storage medium described herein is provided wherein a plurality of optically detectable indicia are embedded within a magnetic tape. An exemplary method for forming the plurality of indicia within an embedded layer of the magnetic tape is also described that may reduce or eliminate the creation of debris and create more precisely formed indicia. Further, an exemplary method is described for tracking storage media with embedded servo tracks that may include detecting or accessing the indicia from either of the two major sides of the magnetic storage media, e.g., the same or opposite surface as a magnetic recording layer.

Forming optical indicia embedded within the storage medium offers several advantages over conventional backside etching. For example, the debris field created by laser ablation or the like is generally eliminated. Further, more precise indicia may be formed with embedded indicia than with a backside etch because the heat generated to form the indicia may be localized to a greater degree within an embedded portion of the storage medium. Eliminating the debris field and precisely forming the indicia may reduce noise when detecting the indicia with an optical detector. Therefore, more accurate linear tape motion detection and tracking may be achieved. The ability to track the storage medium more accurately may allow for more data tracks and increased data storage capacity of the medium.

Additionally, in some examples, the embedded optically detectable indicia and patterned servo tracks are accessible from either side of a storage medium. For example, an optical head or the like may detect the indicia from either side of a magnetic tape. Accessing servo tracks from both sides of a magnetic tape allows for greater design flexibility for drive configurations and compatibility of storage media with various drive configurations.

Further, the embedded indicia are protected from damage such as scratches and the like without an additional step of forming a protective layer over the indicia after they have been formed. For example, scratches may be caused by a roller included in drive system or the like and lead to inaccurate tracking of the storage medium.

The following description describes numerous aspects and examples of the present invention in greater detail. Further, an exemplary storage media device for recording and/or retrieving stored data is described, including exemplary methods and systems for tracking the optically detectable indicia embedded in the storage media.

I. Storage Media

Figure 1B:
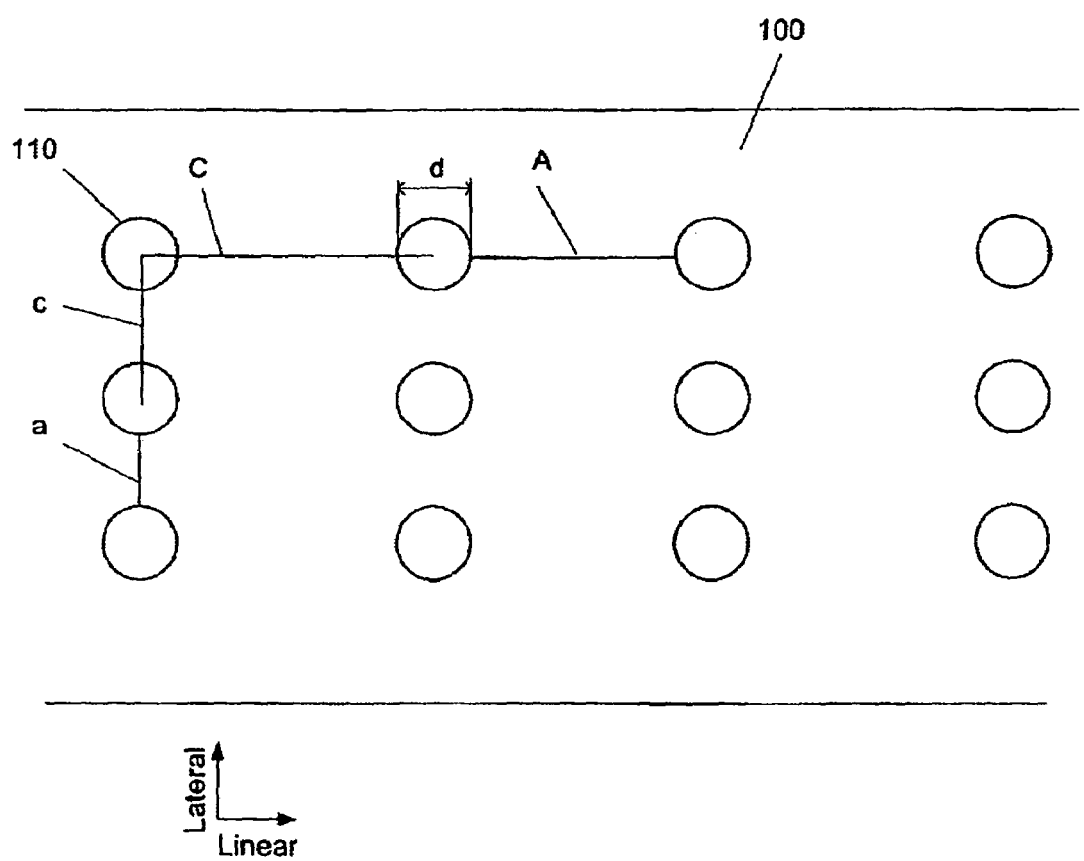

FIGS. 1A and 1B illustrate an exemplary configuration of optical indicia or servo marks 110 embedded in a storage medium, for example, a magnetic recording tape 100. FIG. 1A illustrates a cross-sectional view of various layers that may be included in magnetic tape 100. FIG. 1B illustrates a plan view of a major side of magnetic tape 100 including an exemplary pattern of servo marks 110 illustrated in outline as circles.

With particular reference to FIG. 1A, the cross-sectional view of tape 100 will be described. Tape 100 includes a base film 102, optical servo layer 120, which includes servo marks 110, outer layer coat 104, inner layer 106, base film 108, inner layer 112, and magnetic storage layer 114. Servo marks 110 are formed in servo layer 120 and embedded within tape 100. Servo marks 110 may be patterned such that an optical head or the like may detect and track the tape 100. Specifically, an optical head may direct light to and detect light from servo marks 110. The light detected may determine the position and movement of tape 100 in the lateral and linear dimensions. A system with an optical head and servo controller may also maintain alignment of a read/write head (See FIG. 5A) with tape 100 during lateral motion of the tape 100.

Servo layer 120 may be an organic material such as carbon or the like wherein optically detectable indicia, such as servo marks 110, may be formed by a laser or the like. In particular, servo marks 110 may be formed by heating servo layer 120 with a laser such that localized portions of servo layer 120 are heated and melt or deform to create regions of different reflectivity and/or phase than the surrounding servo layer 120. For example, servo marks 110 may be formed by ultra-violet laser engraving or heating of servo layer 120 embedded within magnetic tape 100. The heating may form pits or marks in the servo layer that are several microns or less in diameter. In other examples, ultraviolet or green wavelength lasers may be used to form servo marks 110. It should be recognized that servo marks 110 may be formed by any suitable method that localizes heat or energy to create indicia with different reflectivity and/or phase than the surrounding optical layer 120. Further, servo layer 120 may be any material wherein servo marks 110 may be formed embedded within tape 100.

The formation of servo marks 110 does not create unwanted debris because servo marks 110 are not formed or burned while exposed to an exterior of tape 100. Further, heat used in forming servo marks 110 may be localized within a smaller area of servo layer 120 than with conventional laser ablation. The localized heat may allow servo marks 110 to be formed within servo layer 120 with increased precision. Further, embedding servo layer 120 and servo marks 110 below the surface of tape 100, for example, between base film 102 and recording layer 114, protects servo marks 110 from damage such as scratches and the like during manufacture and recording or play operations.

Additionally, servo marks 110 may be formed across the lateral width of servo layer 120 and accessed or detected by an optical detector from either side of tape 100. For example, a laser may access servo marks 110 from either major side of tape 100, i.e., through base film 102 or through the recording layer 114. In conventional backside etching of a carbon layer, the pits may be detected from only one side because the pits are generally not formed on both sides of the carbon layer. Access to servo marks 110 from both sides of tape 100 allows a greater degree of freedom in tracking and designing read/write heads to track tape 100.

In this example, servo layer 120 is disposed between base film 102 and outer layer coat 104. Base film 102 may include any suitable tape substrate, such as a flexible plastic substrate such as PolyEthylene Terephthalate (PET), PolyEthylene Naphthalene (PEN), PolyAramid (PA), or the like. Typically, base film 102 provides tape 100 with a rigid base for the magnetic storage layer 114 and the servo layer 120. Further, it is desired that base film 102 be at least partially transmissive to the wavelength of the particular laser or other means used to form servo marks 110 in servo layer 1 20 if servo marks 110 are formed through the side of tape 100 that base film 102 is located. For example, if a laser or the like passes through base film 102 when forming servo marks 110, it is desirable that the base film 102 not be altered in a manner that affects the performance of tape 100. Further, base film 102 should be transmissive to the light used to detect and track servo marks 110 if it is desired to detect servo marks 110 through the same side of tape 100.

Tape 100 may further include outer layer coat 104, inner layer 106, base film 108, inner layer 112, and magnetic storage layer 114. Outer layer coat 104 is provided on the side of servo layer 120 opposite the base film 102. Outer layer coat 104 may include a flexible plastic material or the like. Tape 100 may further include an inner layer 106 formed adjacent the outer layer coat 104 and a second base film 108 disposed adjacent the inner layer 104. An inner layer 112 and magnetic storage layer 114 are disposed adjacent the second base film 108. Any of outer layer coat 104, inner layer 106, base film 108, and inner layer 112 may include any suitable tape material, such as a transparent polymer material or the like, as is known in the art for magnetic tapes. The magnetic storage layer 114 may include gamma ferric oxide, chromium dioxide, Metal Powder (MP) or any other suitable material(s) for magnetically recording and storing information.

The various layers of tape 100 may be bound together with an adhesive, such as an organic resin or the like. Further, some layers may be deposited or formed over adjacent layers. It should further be recognized that various other materials and layers may be included within tape 100 depending on the particular application. It should also be recognized that various layers described herein may be omitted from tape 100 as is known by those skilled in the art.

Tape 100 preferably has a lateral tape width of approximately 0.500 inches, however any lateral width tape 100 is contemplated. Further, the thickness of tape 100 may be approximately 0.005 inches, although thinner or thicker tapes are contemplated.

With reference to FIG. 1B, an exemplary pattern of servo marks 110 embedded within tape 100 is described in greater detail. Servo marks 110 may be positioned at substantially uniform intervals in the linear dimension and substantially uniform intervals in the lateral dimension of tape 100. Typically, the spacing between servo marks 110 in the linear dimension depends on the desired sampling frequency of the position of the tape, and the spacing in the lateral dimension, depends on the desired resolution of detection and servo control of the lateral tape motion. For example, the spacing in the linear dimension may be between about 2 and 200 microns, and the spacing in the lateral dimension may be between about 2 and 100 microns. Preferably, the spacing is between about 2 and 100 microns in the linear dimension and between about 2 and 20 microns in the lateral dimension, and more preferably about 100 microns in the linear dimension and 10 microns in the lateral dimension; however, greater or smaller spacings are contemplated. As will be described in greater detail, however, numerous patterns may be employed depending on the particular application and these spacings should not be viewed as limiting the possible patterns of servo marks 110.

Servo marks 10 may extend the full length of magnetic tape 100 in the linear dimension to form servo tracks that may be followed by an optical servo controller. In this instance, three servo tracks are shown where each servo track is defined by a linear row of marks 10. An optical head may track the servo tracks as tape 100 is streamed or otherwise moved relative to the optical head. Measurements by the optical head may be used as feedback to align a read/write head with one or more, data tracks recorded on the magnetic tape 100. In some examples, multiple rows of marks 110 may form a single servo track to be followed by an optical head.

The distance from the center-to-center of servo marks 110 in the linear dimension is defined herein as distance C. In one example, the transverse size or diameter of servo marks 110 is defined by distance d. The spacing between adjacent servo marks 110, i.e., the distance between the closest edges of two adjacent servo marks 110, is defined by distance A. Servo marks 10 are spaced apart from center-to-center in the lateral dimension by distance c, and from adjacent servo marks 110 by distance a. The various distances may be varied depending on the particular application. Further, in some examples, servo marks 110 may be offset in the lateral dimension as described below (see FIG. 7).

The distance c between marks 110 in the lateral dimension of the tape 100 determines, at least in part, the resolution of the optical servo head, i.e., how precisely the optical head can detect and control motion in the lateral direction of tape 100. The spacing may be based on a characteristic of the tape, i.e., the lateral resolution desired to accurately track data tracks with a read/write head. Further, the distance between marks 110 in the linear dimension of the tape determines how often the servo head samples or measures the lateral position of tape 100.

The spatial distance C between servo marks 110 may be varied depending on the system and method for tracking servo marks 110. For instance, a given sampling frequency depends in part upon the linear speed of the tape 100 and spacing between servo marks 110 when data is read or retrieved by a read/write system. More generally, the pattern, e.g., number and spacing, of servo marks 110 in the lateral and linear dimension depends on the particular application and system. For example, the number and spacing of servo marks 110, may be varied depending on the desired sampling frequency, resolution, linear speed of tape 100, and the like.

It should be recognized, however, that any pattern of embedded servo marks 110 are possible. For example, servo tracks may be formed of continuous lines, as well as patterned and/or non-identical shapes, such as squares, triangles, saw tooth shapes, and the like. Further, the exact distances between servo marks 110 in either the linear or lateral dimension may vary depending on the accuracy of the method used to form servo marks 110 and the desired application. Other exemplary patterns of optically detectable servo marks and servo tracks are described in above referenced U.S. patent application Ser. Nos. 09/046,723 and 09/718,818 both of which are incorporated herein by reference in their entirety.

Further, only three servo tracks of marks 110 are shown in FIG. 1B, however, it will be understood that any number of servo tracks may be included along the full length of the tape 100 to provide an optical servo track that can be monitored and tracked by the optical servo system. Additionally, it will be understood that servo marks 110 may be accessible from the same side of tape 100 as recorded magnetic data tracks or on the opposite side thereof.

With reference to FIG. 2, a cross-sectional view of tape 200 is illustrated. As illustrated, tape 200 may include multiple layers. In this instance, tape 200 includes a base film 202, a magnetic storage layer 214, servo pattern layer 220, inner layer 212, and back coat layer 221. Base film 202 may include a plastic substrate or the like to provide a rigid base for the magnetic storage layer 214 and servo pattern layer 220. On one side of base film 202 magnetic storage layer 214 may be disposed. Magnetic storage layer 214 may include a plurality of data tracks. An inner layer 212 may further be formed between base layer 202 and storage layer 214.

A servo pattern layer 220 may be located adjacent base film 202 on a side of base film 202 opposite of storage layer 214. Servo layer 220 includes a pattern of servo marks 110, for example, as illustrated in FIG. 1B. Servo layer 110 may include carbon or other suitable material for forming servo marks 110 therein. A protective layer 221 may be provided adjacent servo layer 220. Protective layer 221 may be, for example, a thin transparent layer or the like that is desirably transmissive to a laser or other method used for forming servo marks 110. It should be recognized that protective layer 221, as well as other layers disposed between servo layer 220 and an optical head, need not be transparent to visible light; rather, the layers should be transparent to the optical frequency used to detect servo marks 110. For example, if an optical head uses an infrared or ultraviolet laser to detect servo marks 110, protective layer 221 should be at least transparent to infrared or ultraviolet light to allow the optical head access to servo marks 110.

FIG. 3 illustrates a cross-sectional view of another exemplary tape 300. Tape 300 includes base layer 302, servo layer 320, inner layer 312, and storage layer 314. In this example, servo layer 320 is disposed between base layer 302 and inner layer 312. In certain applications, inner layer 312 may be omitted such that servo layer 320 is disposed between base layer 302 and storage layer 314.

With regard to FIGS. 2 and 3, it should be recognized by those skilled in the art that various additional layers may be included with exemplary tapes 200 and 300. Certain layers may also be omitted, such as inner layer 212. Further, magnetic storage layers 214 and 314 may be formed on and accessible from both major sides of tapes 200 and 300, i.e., both sides of the lateral width, depending on the particular application.

Figure 4:
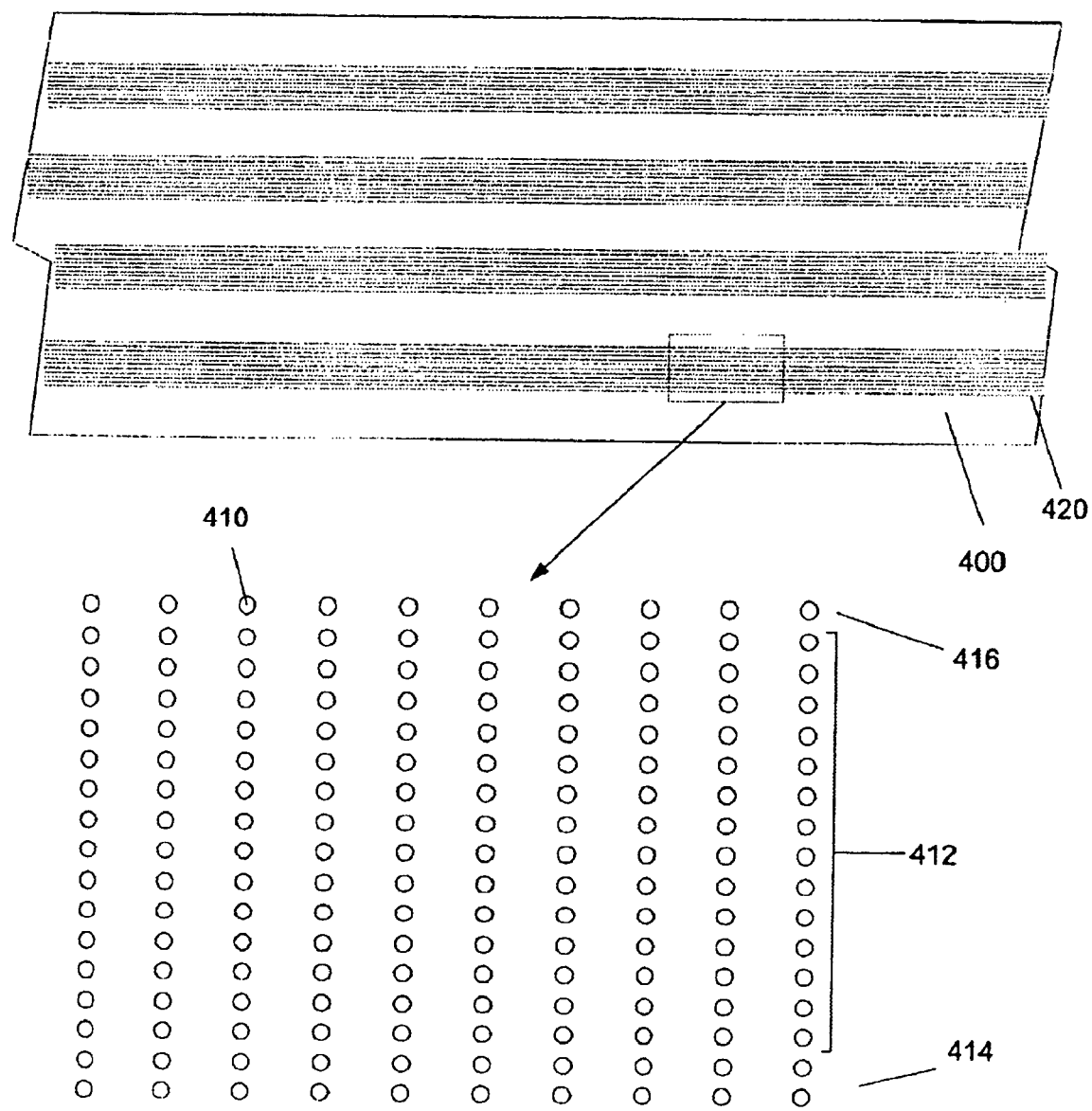
FIG. 4 illustrates an exemplary pattern of optically detectable indicia embedded within a storage medium.

FIG. 4 illustrates an exemplary pattern of embedded optical servo tracks in magnetic tape 400. In this instance, magnetic tape 400 includes a plurality of densely spaced servo tracks that are grouped into a plurality of bands 420. Bands 420 are positioned laterally across the width of the tape 400 and may extend linearly for the length of the tape 400. Tape 400 includes four bands 420 where each band includes seventeen servo tracks to provide sixty-eight servo tracks in all for tape 400. The tracks in the linear direction may include servo marks 410 in the form of holes, circles, or other optically detectable indicia embedded in tape 400 that extend along the length of the tape 400 or band 420. In one example, servo marks 410 are configured with approximately equal spacing in the lateral dimension and approximately equal spacing in the linear dimension. For example, a desired resolution of the optical head to measure and correct for lateral motion may dictate the dimension of the lateral and/or linear spacing.

Each band 420 of servo marks 410 may correspond to a band or group of data tracks on tape 400. A band or group of data tracks is often referred to as a data zone on the magnetic tape 400. For example, a band of data tracks may be included on tape 400 adjacent a band 420 of servo marks 410. Alternatively, data tracks may be interlaced with bands 420 when viewed from a major side of tape 400.

In one example, fourteen of the tracks may be employed as servo tracks 412 that correspond to data tracks of the magnetic recording layer (not shown) of tape 400. Two auxiliary servo tracks 414 may be located near the lower portion of the band 420 and one auxiliary servo track 416 located near the upper portion of the band 420. The auxiliary servo tracks 414 and 416 may include control information as well as delimit the edges of the band 420. The exact number of servo tracks employed may be altered depending on the particular application and desired accuracy of detecting lateral motion of tape 400. Generally, increasing the number of servo tracks 412 increases the detection accuracy of an optical head or the like.

It should be recognized that the exemplary configuration of servo marks 410 and servo tracks 412, 414, and 416 are illustrative only. Various other methods and schemes may be employed for configuring servo tracks on magnetic storage media as are known in the art.

II. Exemplary Method of Tracking Embedded Optical Servo Tracks

Figure 5A:
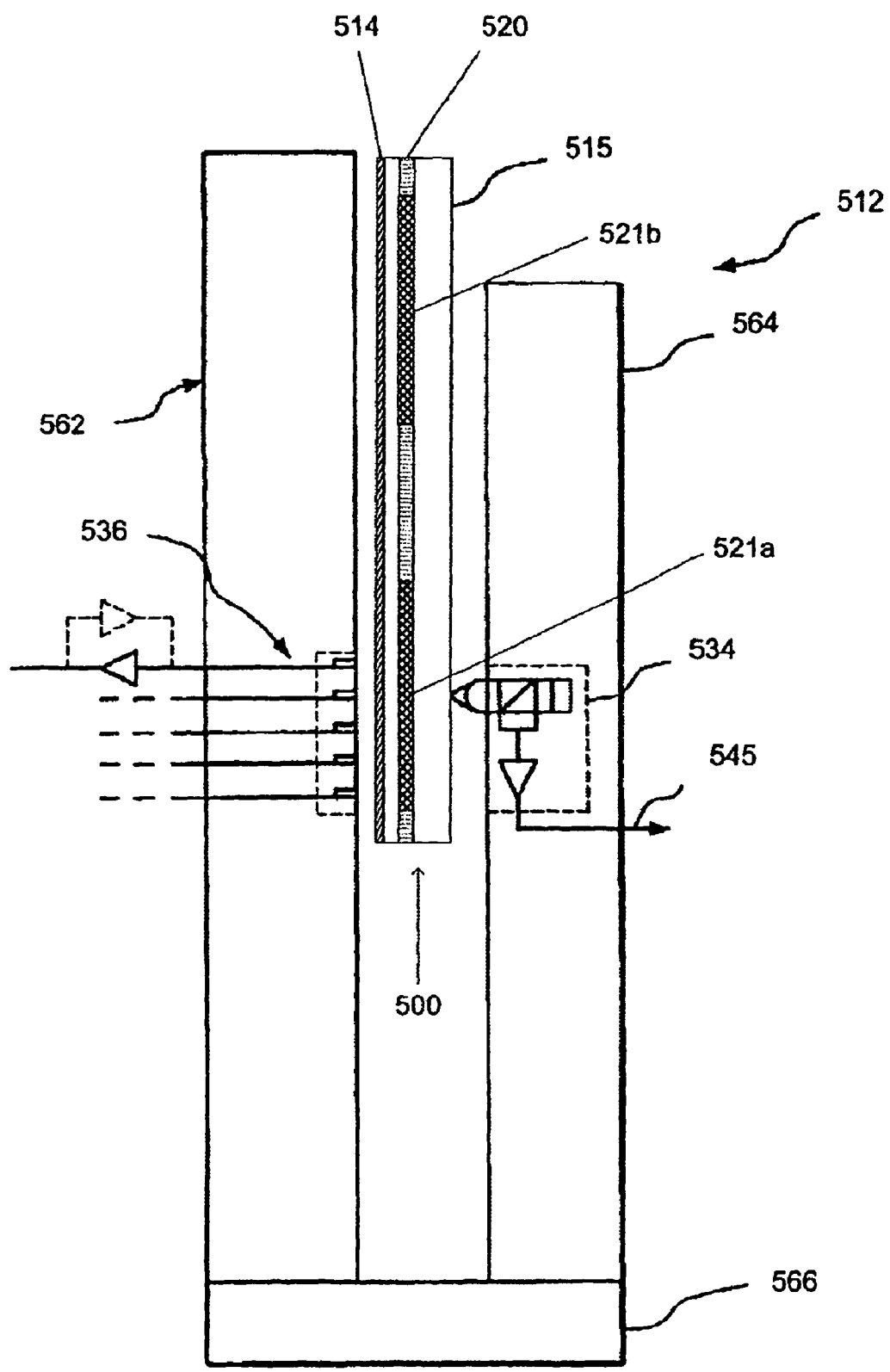
FIGS. 5A, 5B, and 5C illustrate various exemplary read/write head structures including an optical head for tracking storage media with embedded optical tracking features.

FIG. 5A illustrates one embodiment of a magnetic read/write head structure 512 including an optical servo head 534 for tracking optically detectable indicia embedded within an exemplary recording medium. Generally, FIG. 5A depicts a head carriage assembly for a magnetic tape recording and retrieving system capable of being translated laterally relative to a tape path. The tape system may include a fine positioning system and a coarse positioning system for maintaining magnetic head structure 512 adjacent to the tape path. The tape system may further include various other components known in the art such as reels, tape guides, servo control electronics and motors, microprocessor/controller, and the like. For the sake of clarity, however, various other components that may be included have been omitted.

In the instant example, a read/write head structure 512 and magnetic recording tape 500 are illustrated. Magnetic recording tape 500 is shown being drawn through read/write head structure 512 between arms 562 and 564. The tape may be drawn between a supply reel and a take-up reel along a nominal linear tape path through read/write head structure 512. The tape 500 is moved with a relative linear velocity, for example, approximately 120 inches per second Because of the relatively high linear velocity and contact between tape 500 and various mechanical tape guides, head elements, and the like, movement of the tape 500 along the nominal tape path may result in undesirable additional tape movements, in particular, lateral tape motion.

As discussed previously, although various mechanical or open loop mechanisms are known to reduce lateral tape motion to some degree, at certain high linear track speeds and narrow track widths it is not practical to rely entirely upon open loop tape mechanisms. Accordingly, magnetic recording tape 500 may include an optical servo tracking pattern embedded in a servo layer 520 of tape 500 to provide a more precise closed loop servo tracking mechanism. For each data track of magnetic recording layer 514 there may be an associated optical servo tracking pattern, such that if the optical servo head 534 follows the appropriate servo track pattern during linear tape movement, the magnetic head array 536 may follow the data tracks despite lateral tape motion.

In particular, read/write head 512 includes a first arm 562, a second arm 564, a magnetic head array 536, an optical servo head 534, an alignment signal output 545, and a cross-arm 566. FIG. 5A depicts the relationship between the magnetic head array 536, shown as a read/write substrate, the optical servo head 534 and the tape 500. Specifically, tape 500 sits in a gap formed between the first arm 562 and second arm 564. Arm 564 includes the optical servo head 534 and disposes the optical servo head 534 adjacent one side of the tape 500. Similarly, arm 562 carries the magnetic head array 536 and disposes the substrate 536 adjacent to the recording side of the tape 500. The cross-arm 566 holds the arms 564 and 562 in a known, typically fixed relationship such that the relative alignment of the optical servo head 534 and the magnetic head array 536 is known. Accordingly, the head structure 512 depicted in FIG. 5A maintains a data transfer mechanism, such as magnetic head array 536, in a known spatial relationship with the optical servo head 534, thereby allowing for alignment of the data transfer mechanism responsive to a determination of the alignment of the optical servo head relative to the recording medium.

Magnetic head array 536 may include multiple read and write head elements aligned to read some, but not all of the magnetic data storage tracks 506. The write elements are preferably realized as thin film magnetic write structures, and the read elements may be thin film or magneto-resistive read elements. Magnetic head array 536 may include, for example, eight or 16 magneto-resistive read transducers. With the particular arrangement of heads shown in FIG. 5A, the effective recording area tape 500 may be divided into multiple zones or bands of parallel magnetic recording tracks as well as multiple bands of servo tracks shown as 521a and 521b embedded within a servo layer 520. The arrangement may therefore include a head positioner mechanism that coarsely positions the head structure 512 and magnetic head array 536 within a particular zone of the tape 500, for example, corresponding to band 521a. Additionally, to follow the tape despite lateral tape motion, the head positioner mechanism includes optical servo head 534 that may detect the embedded servo track pattern and provide feedback control of the head structure 512.

Optical head 534 may operate to emit and receive light to detect optical servo marks embedded in tape 500. Optical head 534 may include a laser light source that emits a beam, or beam pattern, that can be employed for tracking one or more servo tracks. The laser may be, for example, an ultraviolet laser, infrared laser, or the like capable of detecting embedded indicia. In particular, the light emitted from optical head 534 may pass through tape 500 to reflect or diffract from the embedded marks formed in the servo layer 520. The light may pass through either major side of tape 500, i.e., the magnetic recording layer 514 side or the base film 515 side of tape 500.

An exemplary semiconductor device that includes a laser light source that may be used with an optical head according to one example is described in U.S. Pat. No. 5,729,519, the disclosure of which is incorporated herein by reference. It is believed that the semiconductor device described in the above referenced U.S. Patent is embodied in the HUL7001 device manufactured and sold by the Matsushita Company of Takatsuki Japan. Other suitable devices, for example, sold by Matsushita Company include the HUL7202 and other HUL72XX devices. The device acts to emit and receive a pattern of light that may be focused onto the servo layer of tape 500 to provide a selected pattern of spots. The pattern of spots provided by the optical head 534 may correspond to a characteristic of the optically detectable servo tracks carried on the servo layer of tape 500. For example, the optical head 534 may provide a beam configuration that can be focused onto the servo layer of tape 500 to provide a pattern of spots that corresponds to spatial characteristics of the optically detectable servo tracks, such as by providing a pattern of spots that will overlay completely, or selected portions of a pattern of servo marks embedded within tape 500. It should be recognized, however, that any suitable light emitting device may be used.

In alternative examples, the optical head 534 may include other elements and devices for carrying out the emission and reception of light. These may include emission and reception devices that comprise an assembly of discrete optical elements, as well as other semiconductor devices, or hybrid devices. In further alternative examples, the optical servo head 534 may include separate devices for emitting and receiving light, as well as separate devices for emitting and receiving each of the separate beams. Separate emission and reception devices may also be located on common or opposite sides of tape 500. Moreover, the optical servo heads may include light emission and reception devices that include filters, anti-glare coatings, multiples light sources, integrated focusing elements, and the like. Accordingly, it will be understood by one of ordinary skill in the art that the exemplary optical servo head 534 may employ any suitable device for emitting and receiving light for detecting an optical servo track, and the optical servo head 534 is not to be limited to any particular device or system configuration.

Further, optical servo head 534 may act as a transducer that provides a control signal, typically an error signal. To this end the emission and reception system of the depicted embodiment can be coupled directly into an electrical circuit. Specifically, FIG. 5A illustrates that the optical head 534 includes a servo control signal 545 that may be coupled to an electronic circuit or the like, such as an electronic servo-loop circuit that processes signals generated by the optical servo head 534 to align the head structure 512 with data tracks on the magnetic tape 500.

A tape drive system may further include a computer processor for processing the servo control signal 545 provided by the optical servo head 534 to determine various characteristics of the moving tape, such as the direction of the tape, the speed of the tape, the longitudinal position of the tape, and the like. For example, the system may include any suitable microprocessor/microcontroller system that may be programmed for processing the information collected by the optical servo head 534. The computer processor may process signals from optical head 534 to provide coarse and fine head positions based upon servo loop controls and the like. The fine head position control loop may respond to tape position information sensed by the optical head 534 based on one of the servo track patterns that corresponds to the set or group of linear tracks presently being followed. Any positional offset or position error sensed by the optical head 534 may result in a corrective driving current signal to move the head accordingly for correct alignment with the magnetic data record tape tracks being followed as the optical head 534 follows a particular servo track pattern.

Figure 5B:
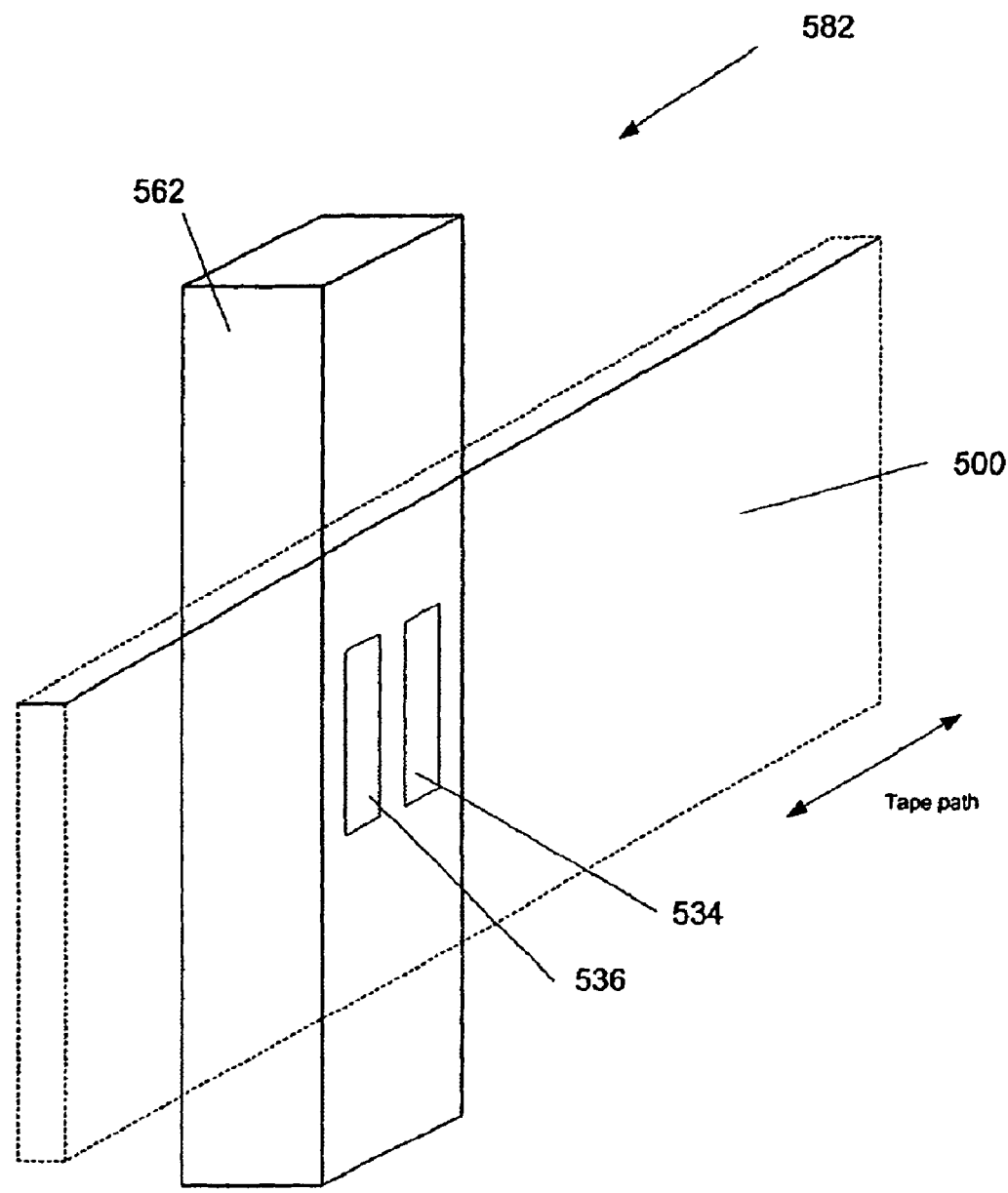

FIG. 5B illustrates another exemplary magnetic read/write head structure 582 including an optical servo head 534 for tracking optically detectable indicia embedded within an exemplary recording medium. Tape 500 may stream by optical head 534 and read/write head 536 along a linear tape path. Magnetic read/write head structure 582 may be similar to magnetic read/write head structure 512 except that the optical head 534 is located on arm 562 with read/write head 536 and arm 564 may be omitted. With the optical head 534 and read/write head 536 positioned on the same side of tape 500 the light from the optical head 534 passes through magnetic layer 514 to detect servo layer 521 a (see FIG. 5A). In particular, light that is incident, at least in part, upon the servo marks may be reflected back to a higher degree (or in some instances to a lower degree) to the optical head 534 than light that is not incident upon embedded servo marks. Light that is not incident upon servo marks will have a higher transmission rate through tape 500 and less reflection detected by optical head 534. It should be noted that in general a portion of the light will be reflected and transmitted through each layer of tape 500.

Figure 5C:
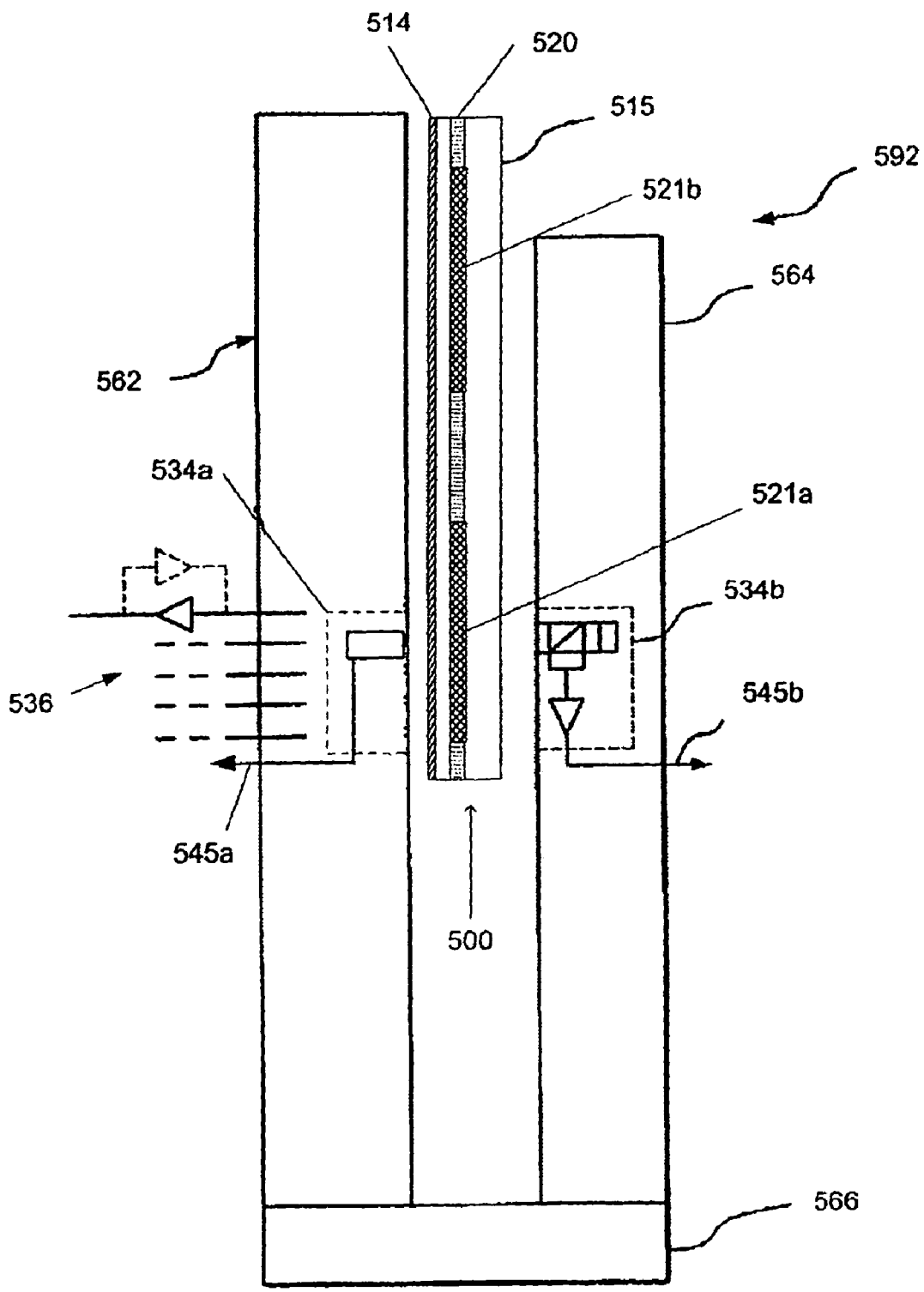

FIG. 5C illustrates another exemplary magnetic read/write head structure 592 including an optical servo head 534 for tracking optically detectable indicia embedded within an exemplary recording medium. Magnetic read/write head structure 592 may be similar to magnetic read/write head structure 512 except that a light source 534a is located on one arm, e.g., arm 562, and the detector 534b is located on an opposite arm, e.g., arm 564. Magnetic read/write head structure 536 and light source 534a may be located on arm 562 similar to FIG. 5B, however, head structure 536 is omitted from FIG. 5C for illustrative purposes to clearly show the relationship between light source 534a and detector 534b. It should be recognized that light source 534a and detector 534b may be interchanged on arms 562 and 564 depending on the particular application and system design.

In this example, the various layers of tape 500, e.g., the base layer 515, servo layer 520, recording layer 514 and the like may have different transmission and reflectance properties to the optical beam. The servo marks 110 embedded in servo layer 520 may have a different transmission rate and/or reflectivity rate. For example, the material selection of the servo layer may result in servo marks 110 scattering incident light to a greater degree than the surrounding servo layer and reflecting less light. The optical detector 534b may therefore be disposed on an opposite side of tape 500 as the light source 534a and configured to measure the light that passes through tape 500. Alternatively, optical detector 534b may be disposed on the same side of tape 500 as the light source 534a and configured to measure the light that passes through a portion of tape 500 and reflects back towards the detector 534b. Signal output 545a from light source 534a and signal output 545b from optical detector 534b may by used by a computer processor or the like to provide coarse and fine head positions based upon servo loop controls as described with regard to FIG. 5A.

Figure 6:
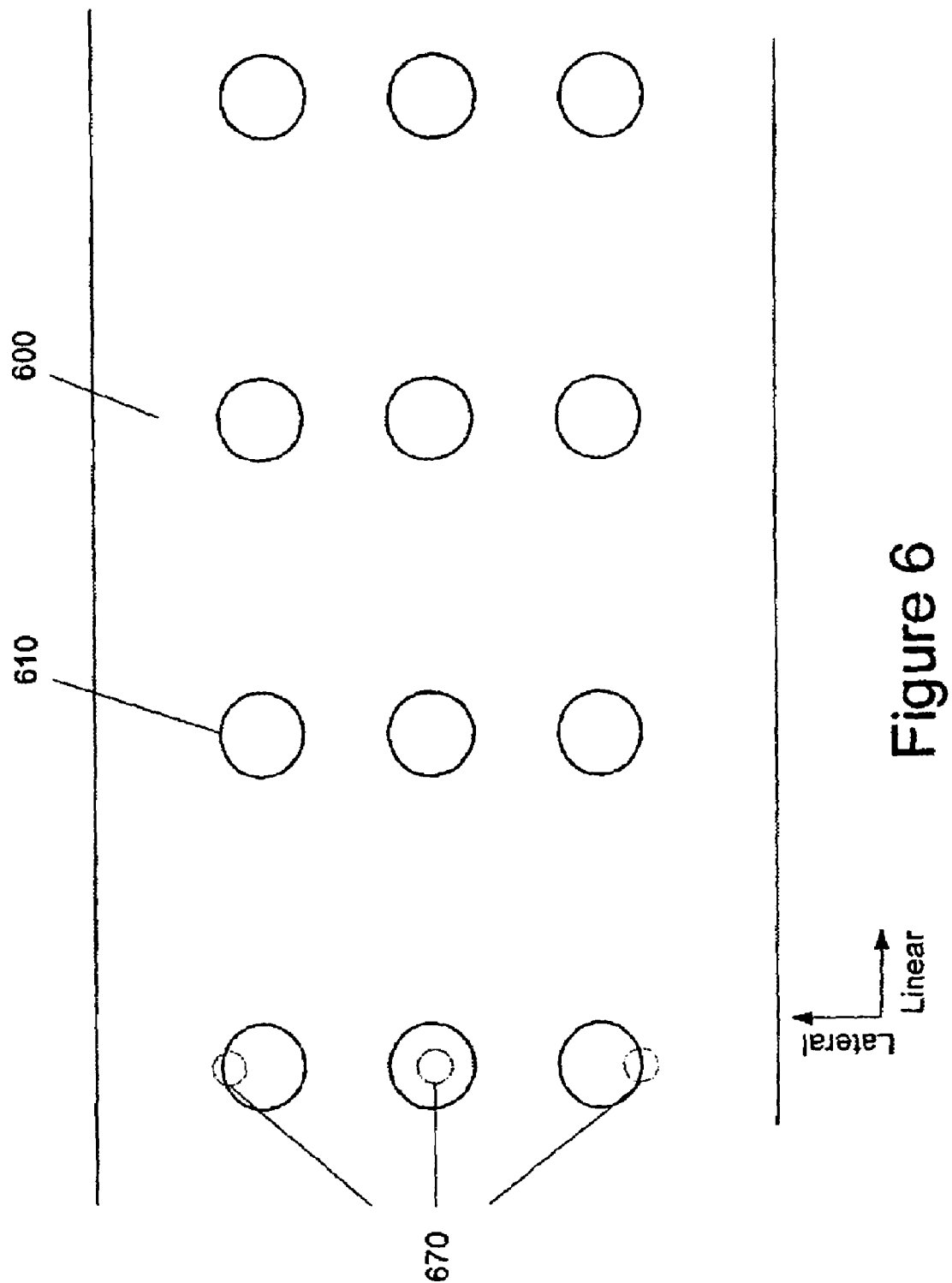
FIG. 6 illustrates an exemplary method for tracking storage media.

With reference to FIG. 6, an exemplary pattern of optical beams 670 is illustrated superimposed over a pattern of servo marks 610 embedded within tape 600. In this example, three servo tracks are shown, however, it will be understood that any number of servo tracks may be used along the length of the tape 600 to provide an optical servo track pattern that may be monitored and tracked by an optical servo system. Further, any number of optical beams may be employed to track the position and movement of tape 600.

As tape 600 moves linearly in the direction of linear motion indicated in FIG. 6, optical servo marks 610 are carried linearly across the front of optical head 534 (FIGS. 5A–5C). As servo marks 610 move by optical head 534, the optical head 534 may activate one or more light sources to generate one or more optical beams directed to one side of tape 600. The light emitted by the light source may pass through various diffraction grating, lenses, prisms, and the like to diffract the light into a diffraction pattern that includes, for example, a zero order beam and a plurality of higher order beams. In one example, the pattern emitted from the light source may be configured and focused by suitable optical elements into a multi-beam configuration that includes a zero order beam and two first order beams, both of which first order beams travel along an axis that is transverse to the axis along which the zero order beam travels. The three beams 670 may therefore be focused to pass through a surface of tape 600 to the servo layer of tape 600 in a pattern that is suited for detecting the pattern of marks 610 embedded within tape 600.

The optical beams 670 of the exemplary pattern illustrated in FIG. 6 are projected to have a diameter approximately one-third the size of the diameter of servo marks 610. The diameter of servo marks 610 maybe in the range of 2 to 15 microns, for example, and the beams might be configured to have a diameter approximately one-third that size. In this example, for a properly aligned tape 600, both the upper and lower servo marks 600 will reflect an equal intensity (or phase) of light back to a receiver or detector such as a photodetector or the like. For a tape that has moved laterally relative to an optical servo head, and therefore is out of alignment, the diffraction pattern emitted from the optical servo head will fail to align with the pattern of servo marks 670 on tape 600, and a detector or detectors will measure different levels of intensity. For example, if tape 600 moves laterally upward relative to an optical servo head, the upper servo mark 610 will move upward, thereby being repositioned further into the upper beam 670 that, when properly aligned, impinges on only the upper half of servo mark 610. Simultaneously, the lower servo mark 610 will also move upward, thereby being repositioned away from the lower beam 670 that, when properly aligned, impinges on the lower half of the servo mark 610. Accordingly, the upper servo mark 610 will reflect more light back to the optical serve head and the lower servo mark 610 will reflect less light back to the optical servo head and one detector will measure a corresponding increase in reflected light intensity and one detector will measure a corresponding decrease in reflected light intensity. This provides a push-pull tracking mode control signal that allows the system to sense lateral movement of the tape 600 that is less than the diameter of a single servo mark 610. Accordingly, the systems described herein can detect lateral movement of the tape that is less than one micron, i.e., sub-micron.

Continuing with the example of the push-pull tracking method and system, it is understood that an optical head may provide signals corresponding to the increasing and decreasing intensity levels that arise when the tape 600 moves laterally with respect to the optical head. As described in the above mentioned U.S. patent application "Multi-Channel Magnetic Tape System Having Optical Tracking Servo," these signals may be provided to a differential servo control system that employs the difference between these two signals to adjust the position of the optical head (and the recording head) relative to the position of tape 600. The servo control system may move the optical head and magnetic recording head to maintain proper alignment with tape 600.

Figure 7:
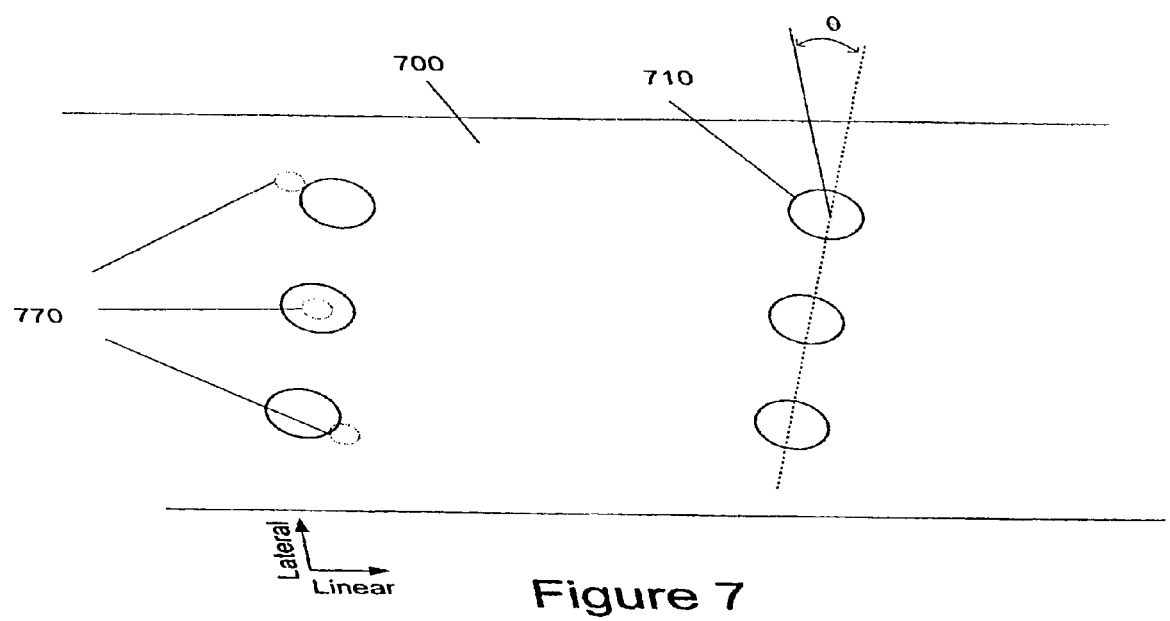
FIG. 7 illustrates an exemplary pattern and method of tracking storage media.

FIG. 7 illustrates an exemplary method for tracking motion of a tape 700 that includes servo marks 710 configured along an offset axis. For example, servo marks 710 of tape 700 are aligned along an axis that is tilted at an angle of approximately θ relative to an axis extending perpendicular to the direction of linear tape movement. Preferably, the angle of offset is approximately 7 degrees, but other angles may be advantageously used depending on the particular application. An offset configuration of servo marks 710 provides a leading mark and a lagging mark that may provide phase information and allow an optical servo head to detect the direction of travel of tape 700. 100701 As discussed above, the optical servo head may project optical beams or spots onto portions of tape 700 to employ a push-pull tracking mode detection system and achieve fine control over the head/tape alignment. Additionally, it will be understood that the optical servo head can be employed for providing tape speed information. Specifically, as the pitch between servo marks 710 on the tape 700 may be a fixed known value, and as the sets of servo marks 710 may extend along the full length of tape 700, the detection information provided by an optical head may provide a measure of the rate at which the sets of servo marks 710 are passing in front of the optical servo head. Accordingly, the optical servo head may detect that marks 710 are passing in front of the tape at a given frequency, which for a known linear spacing between marks 710, may be translated into an inch/second tape rate.

It should be recognized that lateral or linear tape motion of any of these examples may be determined with only the center mark, or any one mark, without employing the push-pull method. Further, other servo track detection techniques can be employed without departing from the scope of the invention. Additionally, in other examples, the optical servo head can be employed to read information on the tape, either encoded on a separate track, or encoded within the servo track. For example, the optical track can be employed to provide information representative of the longitudinal location of the section of the tape adjacent the read/write head. To this end, the tape can include encoded down-the-tape location information for indexing the longitudinal position of the tape. Additionally, the optical servo head can be employed for detecting information representative of the section of tape, or the band of tape being processed, for tapes that are subdivided into sections, such as bands of data. The optical servo head can also be employed for detecting cross-tape position information, or any other type of information that may be helpful to read or write data onto the storage media.

The above detailed description is provided to illustrate exemplary embodiments and is not intended to be limiting. It will be apparent to those skilled in the art that numerous modification and variations within the scope of the present invention are possible. For example, various servo patterns and detection methods are within the contemplation of the invention. Further, numerous other materials and processes not explicitly described herein may be used within the scope of the exemplary methods and structures described as will be recognized by those skilled in the art. Accordingly, the present invention is defined by the appended claims and should not be limited by the description herein.

What is claimed is:

1. A storage medium, comprising:
   a magnetic recording tape including a magnetic recording layer and having a major first side and a major second side; and
   a plurality of optically detectable indicia embedded in a servo layer, the indicia disposed during formation between the first side and the second side and apart from a surface of the first side and a surface of the second side, wherein the indicia are optically accessible from at least one of the first side and the second side of the tape.

2. The medium of claim 1, wherein the optical reflectivity of the indicia is different from the surrounding servo layer.

3. The medium of claim 1, wherein the phase of the indicia is different from the surrounding servo layer.

4. The medium of claim 1, wherein the servo layer is disposed between a base layer and a magnetic recording layer.

5. The medium of claim 1, wherein the servo layer includes an organic material.

6. The medium of claim 1, wherein the servo layer includes carbon.

7. The medium of claim 1, wherein the indicia are detectable with infrared light.

8. The medium of claim 1, wherein the indicia are detectable with ultra violet light.

9. The medium of claim 1, wherein the recording layer is accessible from the first side and wherein the indicia are optically accessible from the first side.

10. The medium of claim 1, wherein the recording layer is accessible from the first side and wherein the indicia are optically accessible from the second side.

11. The medium of claim 1, wherein the indicia are optically accessible from the first side and the second side of the tape.

12. The medium of claim 1, wherein the indicia include a pattern of marks with equal spacing in a linear dimension of the tape.

13. The medium of claim 1, wherein the indicia include a pattern of marks with equal spacing in a lateral dimension of the tape.

14. A storage medium, comprising:
   a magnetic recording tape having a major first side and a major second side;
   a magnetic recording layer accessible from the first side of the tape; and
   a plurality of optically detectable indicia embedded between the first side and the second side and disposed during formation apart from a surface of the first side and a surface of the second side, wherein the indicia are optically accessible from the first side.

15. The medium of claim 14, wherein the indicia are formed in a servo layer located between the first side and the second side.

16. The medium of claim 15, wherein the servo layer is disposed between a base layer and the magnetic recording layer.

17. The medium of claim 15, wherein the servo layer includes an organic material.

18. The medium of claim 15, wherein the servo layer includes carbon.

19. The medium of claim 15, wherein the optical reflectivity of the indicia is different from the surrounding servo layer.

20. The medium of claim 15, wherein the phase of the indicia is different from the surrounding servo layer.

21. The medium of claim 14, wherein the indicia are detectable with infrared light.

22. The medium of claim 14, wherein the indicia are detectable with ultra violet light.

23. The medium of claim 14, wherein the indicia include a pattern of marks with equal spacing in a linear dimension of the tape.

24. The medium of claim 14, wherein the indicia include a pattern of marks with equal spacing in a lateral dimension of the tape.

25. A method for forming a servo track, comprising:
   forming optical indicia within a magnetic recording tape from a first major side of the tape, wherein
   the tape includes the first major side and an opposite second major side, and
   the optical indicia are formed below a surface of the first side of the tape and apart from the surface of the first side of the tape.

26. The method of claim 25, wherein the indicia are optically detectable from at least the first side or the second side.

27. The method of claim 25, wherein the indicia are optically detectable from the first side and the second side.

28. The method of claim 25, wherein forming the optical indicia includes using a laser.

29. The method of claim 25, wherein the optical indicia are formed in a servo layer, wherein the servo layer is disposed between at least a first layer and a second layer.

30. The method of claim 29, wherein at least one of the first layer and the second layer includes a magnetic recording layer.

31. The method of claim 30, wherein the optical indicia are optically detectable from the same side as the magnetic recording layer.

32. The method of claim 25, wherein the optical indicia are formed in a servo layer that includes an organic material.

33. The method of claim 25, wherein the optical indicia are formed in a servo layer that includes carbon material.

34. The method of claim 25, wherein the optical indicia are detectable with infrared light.

35. The method of claim 25, wherein the optical indicia are detectable with ultra violet light.

36. The method of claim 25, wherein forming the optical indicia includes focusing light to a location below the surface of the first side of the tape.

37. The method of claim 25, wherein forming the optical indicia includes producing localized heat at a location below the surface of the first side of the tape to modify a portion of the tape.

* * * * *